Figure 1:
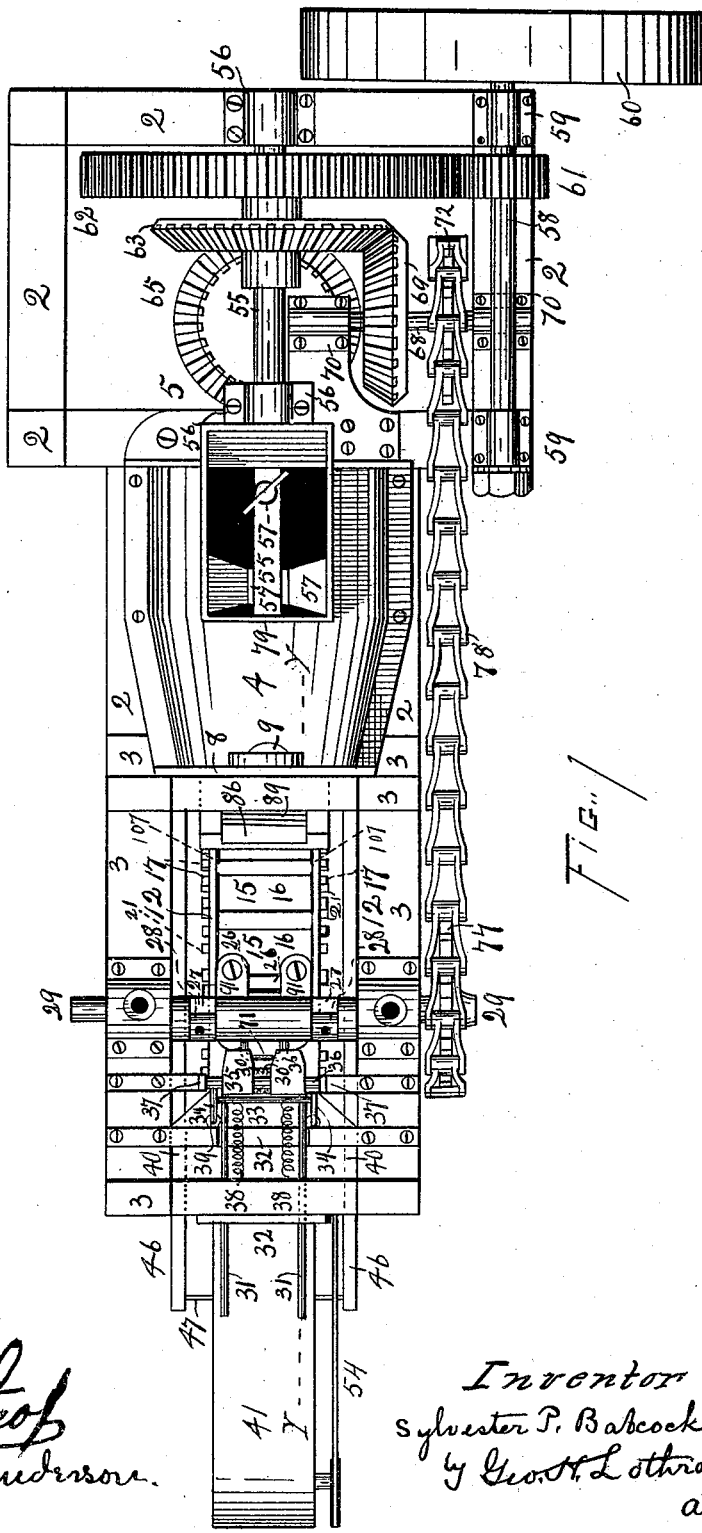

(No Model.) 5 Sheets—Sheet 1.

S. P. BABCOCK.
BRICK MACHINE.

No. 488,106. Patented Dec. 13, 1892.

Witnesses
Jno. E. Lothrop
Gertrude K. Anderson.

Inventor
Sylvester P. Babcock
by Geo. H. Lothrop
atty.

(No Model.) 5 Sheets—Sheet 2.
S. P. BABCOCK.
BRICK MACHINE.
No. 488,106. Patented Dec. 13, 1892.
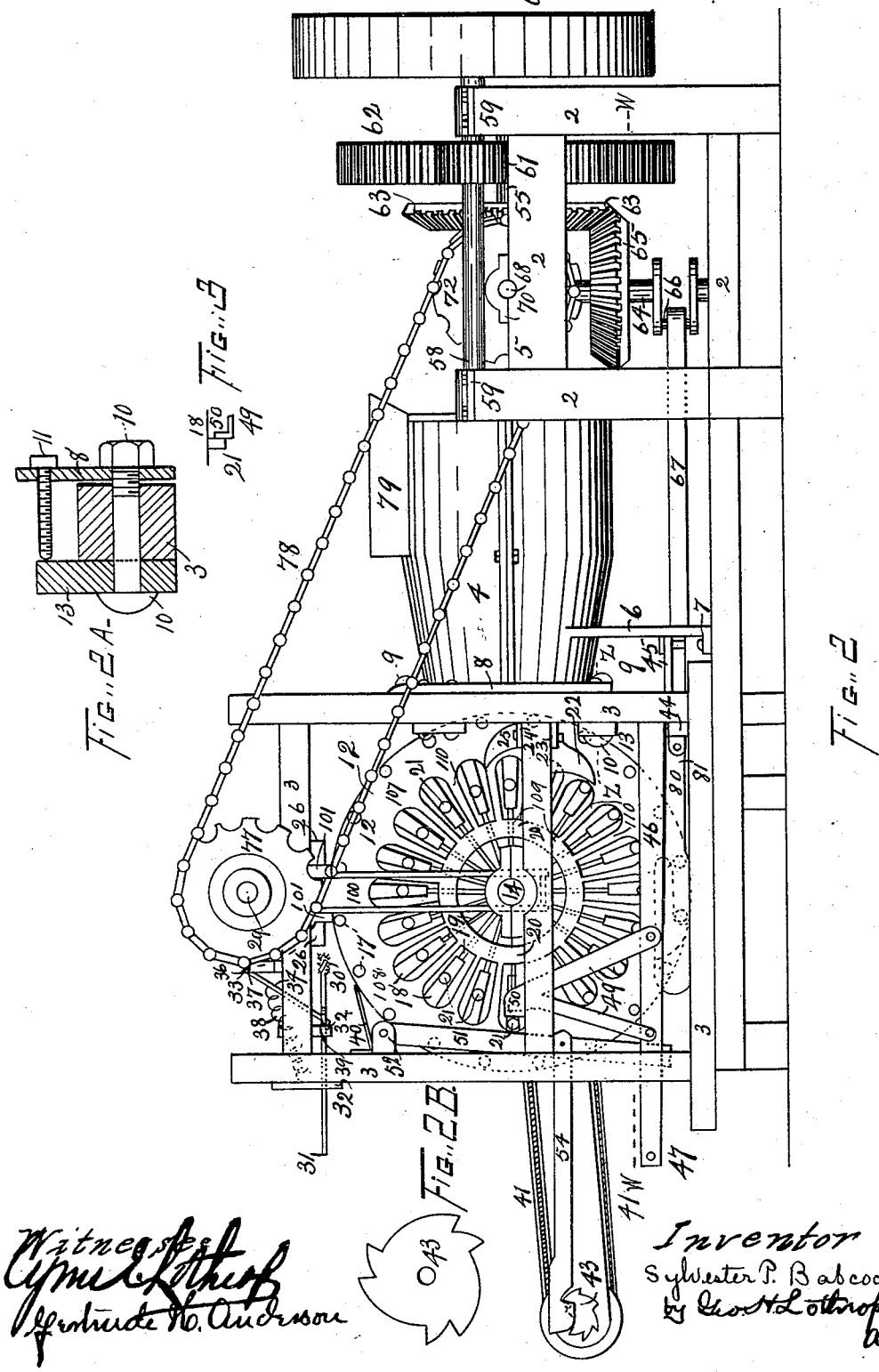
Witnesses:
Cyrus E. Lothrop
Gertrude N. Anderson
Inventor
Sylvester P. Babcock
by Geo. H. Lothrop
Atty

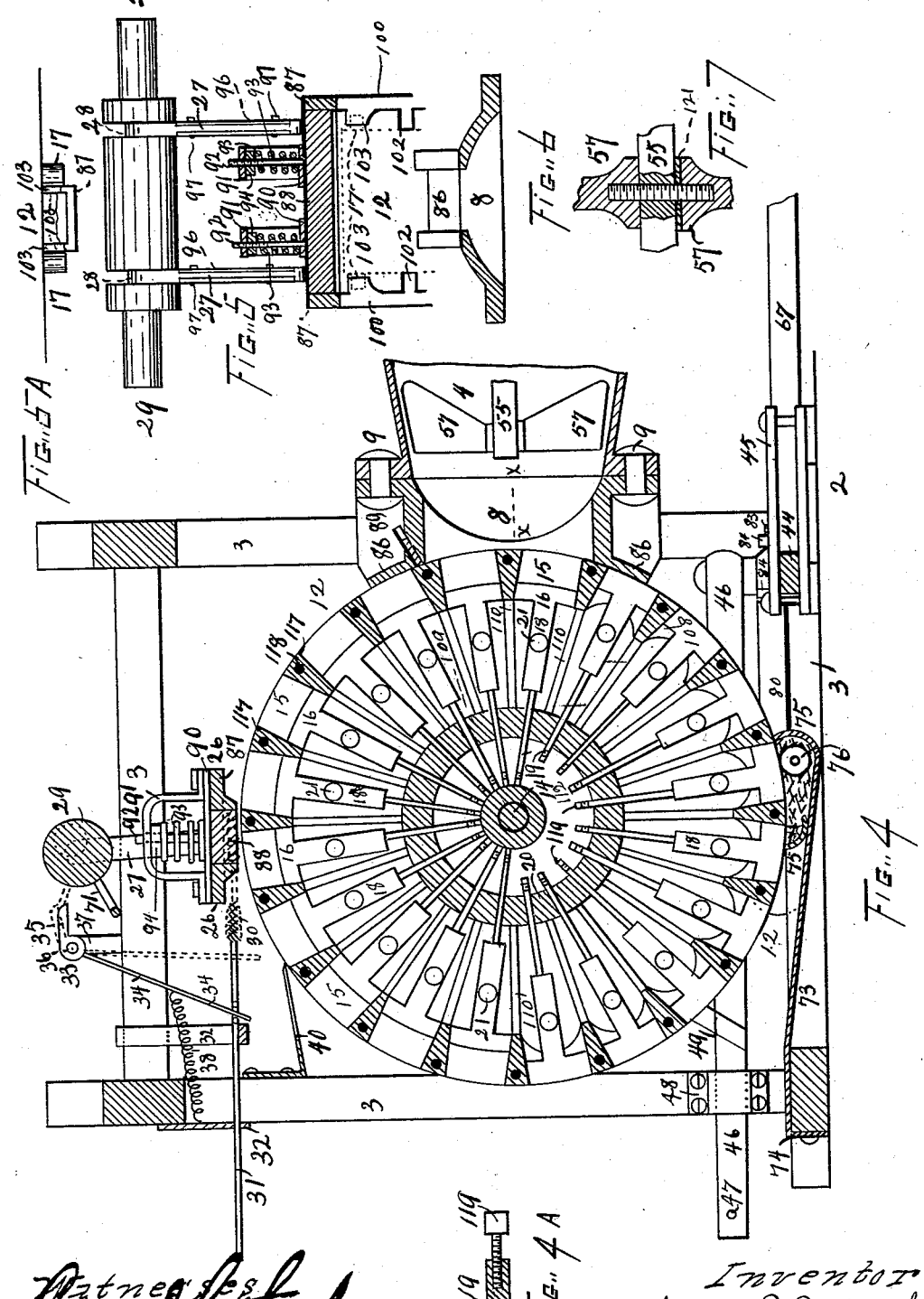

(No Model.) 5 Sheets—Sheet 4.
S. P. BABCOCK.
BRICK MACHINE.
No. 488,106. Patented Dec. 13, 1892.
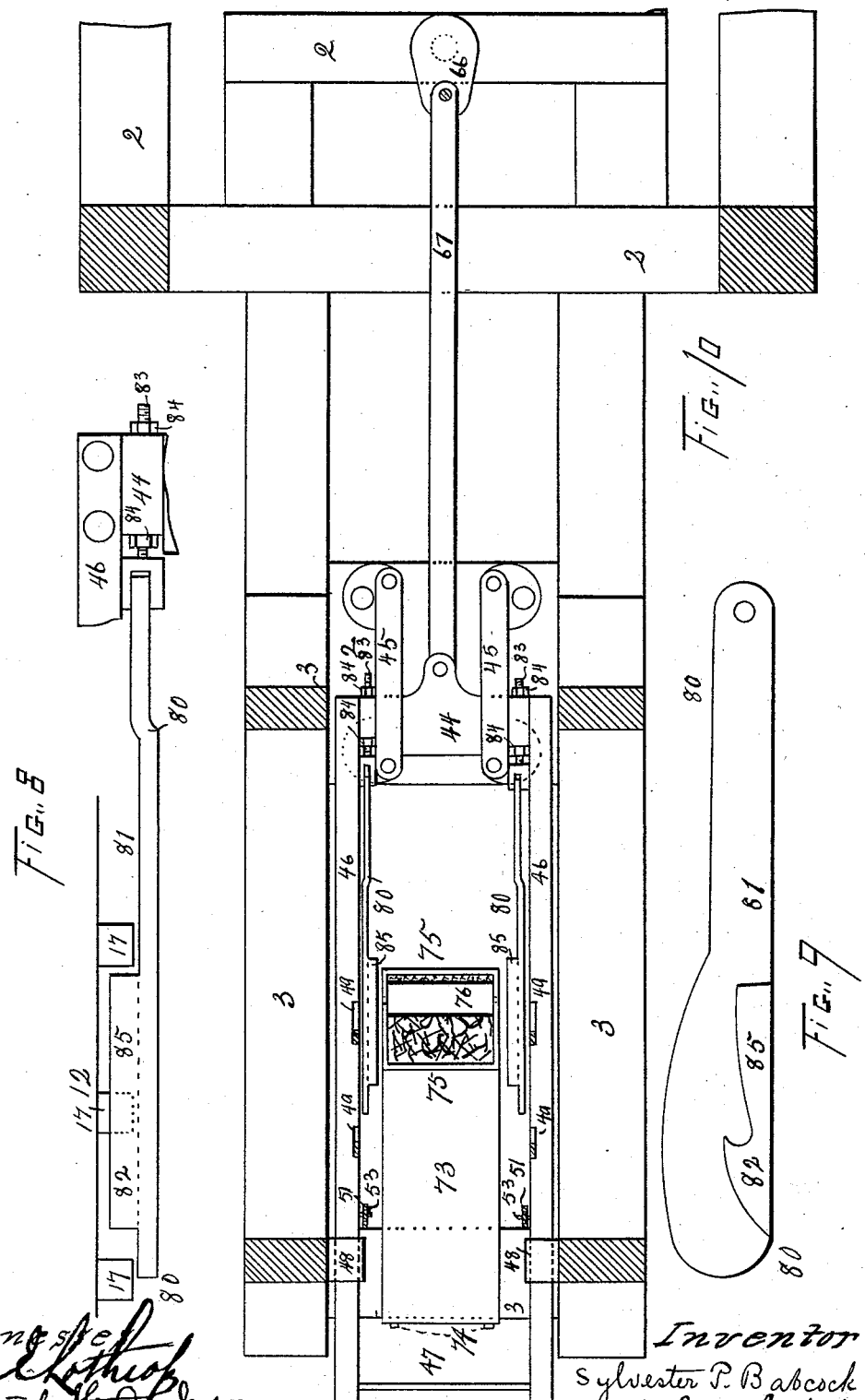
Witnesses
Cyrus E Lothrop
Gertrude H. Anderson
Inventor
Sylvester P. Babcock
by Geo H Lothrop Atty (No Model.) 5 Sheets—Sheet 5.
S. P. BABCOCK.
BRICK MACHINE.
No. 488,106. Patented Dec. 13, 1892.
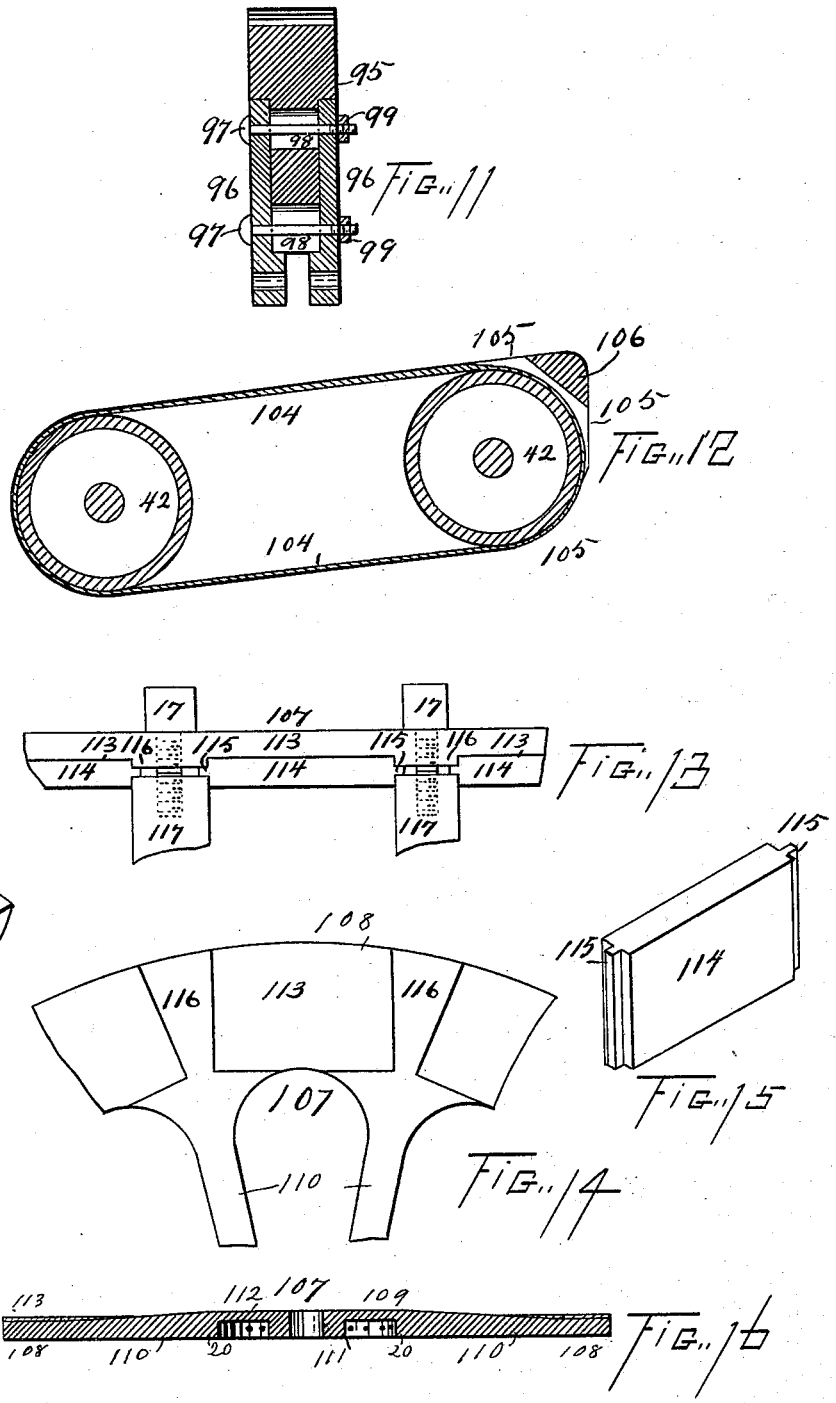

UNITED STATES PATENT OFFICE.

SYLVESTER P. BABCOCK, OF ADRIAN, MICHIGAN.

BRICK-MACHINE.

SPECIFICATION forming part of Letters Patent No. 488,106, dated December 13, 1892.

Application filed February 29, 1892. Serial No. 423,178. (No model.)

*To all whom it may concern:*

Be it known that I, SYLVESTER P. BABCOCK, of Adrian, in the county of Lenawee and State of Michigan, have invented a new and useful Improvement in Brick-Machines, of which the following is a specification.

My invention consists in certain improvements in brick-machines, hereinafter fully described, and pointed out in the claims.
Referring to the accompanying drawings, Figure 1 is a plan view of a machine embodying my invention. Fig. 2 is a side elevation of the same. Fig. 2ᴬ is a detail section taken upon the line Z Z, Fig. 2. Fig. 2ᴮ is a side elevation of the ratchet-wheel by which the belt-carrier is operated. Fig. 3 is a detail plan view of one of the push-pins and the lug by which said pin is actuated. Fig. 4 is a section in elevation of a portion of the machine, taken upon the line Y Y, Fig. 1. Fig. 4ᴬ is a detail view, partly in section, of the end of one of the rods which extend from the legs of the follower-plates and the set-screw extending into said rod. Fig. 5 is a detail view of the re-pressing mechanism, partly in section. Fig. 5ᴬ is a detail plan view of a pair of the pull-bolts and pair of the lugs upon the guide-arms of the re-pressing-plunger. Fig. 6 is a section of the mouthpiece of the mixing-barrel, taken on the line X X, Fig. 4. Fig. 7 is a detail view, partly in section, illustrating the manner of attaching the winged arms to their shaft. Fig. 8 is a detail plan view of one of the pull-hooks and the pull-bolts with which said hook engages. Fig. 9 is a plan view of one of the pull-hooks, showing the side of said hook which is toward the center of the machine when the hook is in place. Fig. 10 is a section on the line W W, Fig. 2, the mold-wheel and part of the frame of the machine being removed. Fig. 11 is a transverse central section of one of the suspending arms or pitmen of the re-press-plunger. Fig. 12 is a longitudinal section of the belt-carrier. Fig. 13 is a plan view of a portion of the mold-wheel. Fig. 14 is an elevation of a portion of one of the mold-wheel disks, showing the side which is toward the center of the machine when said disk is in position. Fig. 15 is an isometric view of one of the end plates of the mold. Fig. 16 is a section of one of the mold-wheel disks, taken through one of the spokes; and Fig. 17 is an isometric view of a portion of one of the wedge-shaped steel posts by which the mold-wheel disks are connected.

2 is the frame of the machine.

3 is the frame of the mold-wheel. The frame 3 rests upon one end of the frame 2, but is not directly secured thereto except by adhesion.

79 is a hopper through which the clay is fed to the mixing-barrel.

4 is the mixing-barrel. The mixing-barrel 4 is secured to the frame 2 at 5 and at 7 by a standard 6, Fig. 2.

8 is the mouthpiece of the mixing-barrel. Said mouthpiece is secured to the end of said barrel by bolts 9 9, Fig. 4. The end of the mouthpiece 8 which is farthest from the mixing-barrel is formed in the arc of a circle having about the same radius as the mold-wheel. The frame 3 is connected to the mouthpiece by a draw-bolt 10, Fig. 2ᴬ, passing through a standard of said frame and through a flange 13 of said mouthpiece. By said draw-bolt the frame 3 may be drawn toward the mouthpiece 8 until the mold-wheel is at its proper position relative to said mouthpiece.

11 is a set-screw passing through a flange of the mouthpiece 8 and impinging against a lug 13 upon the frame 3. A set-screw 11 is located upon each side of the mouthpiece 8, near the draw-bolts 10. Said set-screws act to prevent the frame 3 from being drawn too close to the mouthpiece 8.

12 is the mold-wheel keyed to a shaft 14, which shaft rests in bearings upon the frame 3. In the periphery of the wheel 12 are a number of brick-molds 15, and upon each side of said wheel, near the periphery, are pull-bolts 17, extending at right angles to the faces of said wheel. One of the pull-bolts 17 is located midway between each pair of adjacent molds 15.

16 are follower-plates adapted to fit close and reciprocate radially to the wheel 12 in said molds.

18 18 are legs extending from each end of the follower-plates 16, radially to the wheel 12, and 19 are steel rods extending from the inner ends of the leg 18 in the same direction as said legs and passing through armatures formed through the annular shoulder 20.

21 are push-pins extending from the legs 18 at right angles.

22 is a cam-plate secured to the frame 3 at 23, and 25 is a similar cam-plate secured to said frame at 24. The cam-plate 22 is adapted to act upon the push-pins 21 to move the follower-plates 16 toward the center of the mold-wheel 12 as each mold 15 enters the mouth of the mixing-barrel 4, and the cam-plate 25 is adapted to have a similar effect when the molds leave the mouth of the mixing-barrel 4 when the machine is running without any clay in said barrel. Said cam-plates prevent the follower-plate from accidentally coming into contact with the mouth-piece 8 and stopping or breaking the machine or removing the oil from the surface of said plates.

Above the wheel 12, directly over its center, is a re-pressing mechanism consisting of a plunger 26, operated by suspending arms or pitmen 27 27 and by means of two cranks 28 28 upon a shaft 29.

In the position in which the machine is shown in the drawings, just to the left of the re-pressing mechanism is an oiler 30, consisting of a body of cloth stretched over a plate, or a roller may be substituted. The oiler 30 is secured to the ends of rods 31 31, which rods are constrained to reciprocate in a horizontal direction by guides 32 32, secured to the frame 3.

33 is a bell-crank lever consisting of arms 34 34 and 35 35, secured to a rock-shaft 36, which shaft is pivoted in bearings 37 37, secured to the frame 3.

38 38 are tension-springs secured to the frame 3 and to the arms 34 and adapted to draw said arms toward the left.

39 39 are lugs upon the rods 31 31, against which lugs the arms 34 strike to reciprocate the rods 31 31.

71 is an arm upon the shaft 29, adapted to strike against the arms 35 35 and oscillate the rock-shaft 36.

40 is a scraper-plate secured to the frame 3 upon one side and upon the other side resting upon the periphery of the mold-wheel 12.

41 is a belt-carrier for conveying the brick from the machine when discharged from the molds 15. Said carrier consists of endless belts passing over rollers 42 42, Fig. 12, and is actuated through a ratchet-wheel 43, Figs. 2 and 2ᴮ, upon the shaft of one of said rollers.

73, Figs. 4 and 10, is a plate-spring secured at 74 to the frame 3. Said spring extends under the periphery of the mold-wheel 12 beneath the center of said wheel.

75 is a vessel for containing oil, upon the end of the plate-spring 73.

76 is a roller pivoted with its axis parallel to that of the wheel 12 in the vessel 75. The roller 76 is pressed by the resilience of the spring 73 against the periphery of the mold-wheel 12.

44, Fig. 10, is a sliding cross-head adapted to reciprocate in ways 45 45 upon the frame 2 of the machine. Upon each end of said cross-head is secured a horizontal push-bar 46. Said bars extend beyond the mold-wheel 12, are united at their ends by a cross-bar 47, and pass through steady-boxes 48 48 upon an upright of the frame 3.

49, Fig. 2, is a push-arm rigidly secured to and rising from each of the push-bars 46 to a level with the center of the wheel 12.

50, Fig. 3, is a lug extending laterally from the upper end of the push-arm 49 and adapted to engage with the push-pins 21 upon the legs 18 of the follower-plates 16.

51, Fig. 2, is a swinging arm pivoted at 52 to the frame 3.

53 53, Fig. 10, are pins extending from the push-bars 46 46 and engaging with the lower ends of the swinging arms 51 51.

54, Fig. 2, is a pawl pivoted at one end to the swinging arm 51 and engaging at the other end with the ratchet-wheel 43.

80 80 are pull-hooks consisting of the plates 81, from the inside of which extend the flanges 85 and hooks 82. (See Figs. 8 and 9.) The pull-hooks 80 80 are secured to the sliding cross-head 44 by eyebolts 83, passing through apertures in the ends of said sliding cross-head.

84 84 are nuts upon the eyebolts 83, one upon each side of the cross-head 44 upon one of said eyebolts. By the nuts 84 84 the distance of the hooks 82 from the cross-head 44 may be adjusted.

55 55, Figs. 1 and 2, is a shaft pivoted at 56 56 upon the frame 2 of the machine and extending axially nearly through the mixing-barrel 4.

57 57 are winged arms secured to the shaft 55 inside of the mixing-barrel 4, so that their wings shall form acute angles with the axis of said shaft.

58 is a shaft pivoted in bearings 59 59 upon one side of the frame 2, parallel with the shaft 55.

60 is a pulley upon the shaft 58.

61 is a gear-wheel upon the shaft 58, and 62 is a larger gear-wheel upon the shaft 55.

64 is a vertically-extending shaft pivoted in bearings secured to the frame 2 of the machine.

65 is a bevel gear-wheel upon the shaft 64.

66 is a crank upon the shaft 64, and 67 is a pitman connecting the shaft 66 with the sliding cross-head 44.

68, Fig. 1, is a shaft pivoted in bearings 70 70, secured to the frame 2 of the machine and extending at right angles to the shaft 55.

69 is a bevel gear-wheel upon the shaft 68. The teeth of the bevel gear-wheels 65 and 69 mesh with the teeth of the bevel gear-wheel 63.

72 is a sprocket-wheel upon the shaft 68, and 77 is a sprocket-wheel upon the shaft 29.

78 is a chain passing over and engaging with the teeth of the sprocket-wheels 72 and 77.

The operation of the above-described machine is as follows: The pulley 60 is revolved by a belt from the source of power and communicates its motion to the shaft 58. The shaft 58 revolves the shaft 55 by means of the gear-wheels 61 and 62. The bevel gear-wheel 63 revolves with the shaft 55 and communicates its motion to the bevel gear-wheels 65 and 69, and consequently to the shafts 64 and 68. The revolving of the shaft 64 reciprocates the sliding cross-head 44 by means of the crank 66 and pitman 67. The reciprocation of the cross-head 44 moves the pull-hooks 80 80 backward and forward. As said pull-hooks move forward they are supported and slightly raised by the flange 85, resting upon one of the pull-bolts 17, Fig. 8. When said pull-hooks are near the end of their forward movement, the flange 85 passes from over that one of the pull-bolts 17 upon which it has been resting, and the hook 82 engages with the next one of the pull-bolts 17. As the pull-hooks 80 80 are drawn backward they draw upon the pull-bolts with which they are engaged and revolve the mold-wheel 12 a distance equal to the space between the centers of adjacent molds 15, and thus bring another of said molds within the mouth of the mixing-barrel 4. The revolving of the shaft 55 drives the clay, by means of the winged arms 57, with considerable force into the molds 15, that are opposite the mouth of the barrel 4, thus pressing the follower-plates 16 backward toward the center of the wheel 12 and filling said molds with clay. The follower-plates 16 are moved a short distance inward by the cam-plates 22 and 24 engaging with the push-pins 21 upon the legs of said plates, so that said plates shall not be in such a position that their outer surfaces shall protrude from the periphery of the mold-wheel 12 and catch upon the mouthpiece 8 of the mixing-barrel 4, and so that the oil which has been placed upon said surface by the roller 76 shall not be wiped off when the molds enter the mixing-barrel. The revolution of the bevel gear-wheel 63 revolves the bevel gear-wheel 69, shaft 68, and sprocket-wheel 72. The sprocket-wheel 77, and consequently the shaft 29, are revolved by means of the sprocket-wheel 72 and chain 78. As each of the molds 15 which has previously been filled with clay from the barrel 4 comes beneath the plunger 26 said plunger is driven downward against the clay in said mold by means of the suspending arms or pitmen 27 27 and presses the clay into an accurate form. When the plunger 26 is nearly at its highest position, the arm 71 strikes against the arms 35 35, oscillating the bell-crank lever 33 and forcing the repress-oiler 30 forward and against the under surface of the plunger 26. When the arm 71 has passed by the arms 35 35, the bell-crank lever 33 is drawn back to its former position by the springs 38 38. The scraper 40 removes any clay that may have been left upon the outside of the periphery of the mold-wheel 12. The push-bars 46 46 are drawn backward by the sliding cross-head 44, carrying with them the push-arms 49 49. By the revolution of the mold-wheel 12 a push-pin 21 is brought in line with the upper end of each of the push-arms 49. As said push-arms move forward, the lugs 50 come in contact with the push-pins 21, driving said pins forward, and consequently forcing the outer surface of the follower-plates 16 to and slightly beyond the periphery of the mold-wheel 12, thus dropping the molded clay in the form of a brick upon the carrier 41. The reciprocating of the push-bars 46 46 oscillates the swinging arm 51 and reciprocates the pawl 54, thus turning one of the drums 42 of the carrier by means of the ratchet-wheel 43. As the mold-wheel 12 revolves, the outer surfaces of the follower-plates are oiled by coming in contact with the roller 76, thus guarding against the sticking of the clay in the molds. The shaft 55 within the mixing-barrel 4 is square in cross-section. Holes are bored through said shaft within the barrel 4 on alternate sides, and from three to five inches apart.

The peculiar construction of the winged arms 57 and the manner of attaching them to the shaft 55 make them cheap, durable, and easy to adjust. The base of each of said winged arms is circular and flat, rising cone-shaped to the winged free end. A screw-threaded aperture is formed in this base axially with the arm. A bolt with both ends threaded is screwed tightly into said aperture, and the free end of said bolt is passed through an aperture in the shaft 55 and the wing set at its proper angle to the shaft 55. Then another winged arm is screwed upon the protruding end of said bolt until firmly set to the shaft. The wings should be set at the same angle upon opposite sides of the shaft 55, and this is accomplished by inserting washers 121, Fig. 7, between the base of the arm last adjusted and the shaft. The mixing-barrel 4 is slightly contracted from the hopper 79 toward the mold-wheel 12. The mouthpiece 8 is of the same size and shape as the end of the barrel to which it is attached at that side of said mouthpiece which comes next to said barrel, but is contracted at the sides toward the mold-wheel 12 to a width equal to the length of the molds 15, Fig. 6, so that the shape of the opening toward said mold-wheel is that of a rectangle that is two or more times as long as wide. From the upper and lower sides of the mouthpiece 8 next to the mold-wheel 12 extend lips 86 86. The outer sides of said lips form a continuation of the side of said mouthpiece which is toward the wheel 12. The lower lip 86 covers the molds 15 until they are fully within the mouthpiece, and the upper lip 86 covers said molds until they are fully without the mouthpiece. Said lips prevent the clay from being forced out of the machine. A hardened steel plate 89, Figs.

1 and 4, is passed through a slot at the base of the upper lip 86 in a direction that forms an acute angle with the periphery of the wheel 12. The lower edge of said plate is beveled to fit the periphery of said wheel and extends a short distance into the opening of the mouthpiece 8, and acts as a cut-off to separate the clay in the mold from the clay in the barrel 4. Said plate may be easily replaced when worn out, and may be easily removed to be sharpened.

The repress-plunger 26 consists of a frame or box 87, surrounding a plunger 88 upon the sides and ends. 90 90 are metal strips extending laterally above the plunger 88 and secured to the frame 87. 91 91 are stay-bails secured to the frame 87 and extending over the strips 90. 92 92 are rods extending vertically upward from the plunger 88, through apertures, and through the strips 90 90 and stay-bails 91 91. 93 is a coil pressure-spring surrounding the rods 92 92 and resting at their lower ends upon the strips 90 90. 94 94 are nuts upon the rods 92, by which the pressure of the springs 93 93 upon the strips 90 90 may be adjusted. The suspending arms or pitmen 27 27 are pivoted directly to the plunger 88. Each of said suspending arms is adapted to be adjusted in the direction of its length in the manner illustrated in Fig. 11, in which 95 is a rod adapted to be secured to the cranks 28 28 by straps in the usual way. 96 96 are slip-arms secured upon opposite sides of the rod 95 by slip-bolts 97 97, passing through slots 98 98 in said rod. The slip-arms 96 96 may be adjusted to different positions along the rod 95 by loosening the nuts 99 99 upon the bolts 97. The lower ends of the suspending arms or pitmen 27 27 are secured by pivoting the lower ends of the slip-arms 96 96 to the plunger 88. A greater or less pressure may be brought upon the clay in one of the molds 15 by adjusting the length of the arms 27 27. A pair of guide-arms 100 100 are secured at each end of the plunger 88 and pass downward one of said guide-arms upon each side of the shaft 14 of the mold-wheel 12 and close against said shaft. The upper end of said guide-arms slide in ways 101 101, Fig. 2, secured to the frame 3. 102 102 and 103 103, Fig. 5, are lugs extending inward from the guide-arms 100. The lugs 102 102 are continually in contact with the rim of the wheel 12 and serve to steady the plunger 88 in a lateral direction with reference to the machine. The lugs 103 103 rise above the periphery of the wheel 12 when the plunger 88 is at the upper portion of its stroke, and at the lower portion of the stroke of said plunger said lugs pass snugly between a pair of adjacent pull-bolts 17 and serve to center said plunger accurately over the mold 15 in a longitudinal direction with reference to the machine. (See Fig. 5A.) The frame 87 surrounds a mold 15 and prevents the clay from being forced out of said mold when acted upon by the plunger 88. It will be seen that by the use of the above-described repressing device, if the follower-plates 16 are true with the plunger 88 the repressed clay will have true and parallel sides. The carrier 41 consists of two rollers 42 42, Fig. 12, mounted in a suitable frame. One end of said frame is held close to the mold-wheel 12. Around the rollers 42 42 is stretched a heavy endless belt 104. Over this is placed a light flexible belt 105. A deflector 106, with its corners nearly square, is placed close to the wheel 12, above the belt 104, and secured at its ends in the frame of the carrier. The belt 105 passes loosely over the belt 104, except on the line of its upper surface, where it passes over the deflector 106. By this device almost a right-angled corner can be used. The brick are deposited directly from the mold-wheel 12 and set on their edges on a flat smooth movable belt, delivering the bricks resting on their edges ready for hacking. The ratchet-wheel 43 has teeth of unequal length, alternating one long and one short tooth. (See Fig. 28.) As each brick is delivered the belts 104 105 are moved along a distance proportional to the length of the tooth of the ratchet-wheel 43, with which the ratchet 54 is at that time engaged. By constructing said ratchet-wheel with alternate long and short teeth the bricks are run out in pairs, two close together and then a longer distance intervening.

The mold-wheel 12 is constructed as follows: Two disks 107 107 of the same form are constructed with a solid rim 108 and a solid center 109, said rim and center being connected by spokes 110. The solid center 109 consists of the hub 111 and an annular shoulder 20, concentric with said hub, united by a solid web 112. The outside face of the web 112 is set back a short distance from the face of the disk. Radially through the annular shoulder 20 are bored apertures through which the rods 19 pass. Around the inside face of the disk 107, near its periphery and between adjacent spokes 110, are recesses 113, placed across the rim 108 to a depth of about one-eight of an inch in regular and equal spaces and of just the width of the desired mold. The sides of said recesses are parallel with each other and extend in such a direction that a line midway between them and parallel to them would pass through the center of the disk 107. In the recesses 113 are placed steel plates 114, which are about three-eighths of an inch thick, about as wide as said recesses, and a quarter of an inch longer than said recesses. Said plates are gained out for an eigth of an inch at each end and on both sides to form the tongues 115 115, Fig. 15. Said tongues rest upon the raised portion 116 of the disk 107. When the plates 114 are placed in position, the upper shoulders next to the tongues of adjacent ends of adjacent plates form tapered recesses whose center lines pass through the center of the disks 107. 117 are wedge-shaped steel posts having a cross-section that is the same size and shape as said last-mentioned recesses and of about the length of the required molds. In the ends of said posts are formed screw-threaded apertures 118. To form the mold-wheel 12, two disks 107 107 are united with their centers in line by steel posts 117, the ends of which posts rest upon the tongues 115 and fit snugly against the upper shoulders of the plates 114. Said posts are secured in place and the disks are secured to said posts by the pull-bolts 17, the screw-threaded shanks of which pass through apertures in the rims of said disks and are tightly screwed into apertures 118 in the ends of said posts. (See Fig. 13.) Opposite plates 114 form the ends and adjacent posts form the sides of the molds 115. The follower-plates 16 are placed in the molds 15, with their legs 18 extending toward the center of the wheel 12 and the rods 19 passing through the radial apertures in the annular shoulder 20. The push-pins 21 are secured in place upon the legs 18 in such a position that they shall strike against the inner edge of the rim 108 when the outer surfaces of the follower-plates 16 are a little beyond the periphery of the mold-wheel 12. 119, Fig. 4ᴬ, is a set-screw which is tapped axially into the free ends of the rod 19. The inward travel of the follower-plates 16 is limited by the set-screws 119 striking against the hub 111. The inward travel of said follower-plates can be adjusted by screwing the set-screws 119 in or out of the rods 19. The dished form of the disks 107 between the hub 111 and the shoulder 20 permits access to the set-screws 119 from the outside, and the web 112 and shoulder 20 protect said rods from any clay that may be forced between the follower-plates 16 and molds 15. It will be seen that the steel pull-bolts 17 set the posts 117 firmly on the plates 114 in such a manner that neither plates nor posts require any other fastening, while all may be removed quickly and either posts or plates reversed for new wear. To renew the wearing-surfaces easily is important, as the action of the clay and sand is very severe on all surfaces with which it comes in contact. The wheel 12 revolving always one way when working, one side of each post and the outside of each plate 114 is worn much the fastest. Consequently the reversing adds much to the durability of the parts. The steel pull-bolts 17 not only hold the disks 107 together and secure posts and plates in place, but also serve as lugs to move the wheel 12 by the action of the pull-hooks 80 80, and also serve as guides to the repress-plunger 26 and 88. As the posts 117 are set at equal distances apart, and as the pull-bolts 17 are at equal distances apart and are all alike and motion is given to the mold-wheel only through said bolts, it may be readily seen that the whole wheel may be reversed in its bearings or on its axle and the unworn edges of the molds be made to move the other way and take first action with the steel cut-off 89. Either method of reversing the wearing parts saves much time and expense.

Having fully described my invention, what I claim, and desire to secure by Letters Patent, is—

1. In a brick-machine, the combination of the mold-wheel 12, pull-bolts 17 on said mold-wheel, followers 16, adapted to reciprocate in said mold-wheel, push-pins 21 upon said followers, a sliding cross-head 44, pull-hooks 80, secured to said cross-head and adapted to engage with said pull-bolts, push-arms 49, secured to said cross-head and adapted to engage the push-pins 21, and mechanism for reciprocating said cross-head, substantially as shown and described.

2. In a brick-machine, the combination of a mold-wheel 12, a re-pressing plunger 26, means for reciprocating said plunger, guide-arms 100, secured to said plunger, and lugs 102, extending from said guide-arms and bearing against opposite faces of said mold-wheel, substantially as and for the purpose described.

3. In a brick-machine, the mold-wheel 12, pull-bolts 17, extending from the faces of said mold-wheel, a re-pressing plunger, guide-arms 100, secured to said plunger, lugs 103, extending from said guide-arms and adapted to fit closely against the sides of pull-bolts 17 when said plunger is near said wheel and to permit the passage of said pull-bolts when said plunger is farther away from said wheel, substantially as shown, and for the purpose described.

4. In a brick-machine, the combination of a re-pressing plunger 26, a shaft 29, adapted to reciprocate said plunger, a bell-crank lever 33, an oiler 30, adapted to be reciprocated in ways by the oscillation of said bell-crank lever, an arm 71 upon the shaft 29, adapted to strike against an arm of and to oscillate said bell-crank lever, and means for retracting said bell-crank lever, substantially as shown and described.

5. A double belt-carrier for brick-machines, consisting of rollers 42 42, mounted in a suitable frame, a belt 104, passing around said rollers, a deflector 106, mounted in the frame of said carrier above the belt 104 and above one of said rollers, and a belt 105, passing over the belt 104 and over said deflector, substantially as shown and described.

6. In a brick-machine, the combination, with a carrier consisting of one or more belts passing over rollers 42, of a ratchet-wheel 43, mounted on the shaft of one of said rollers, said ratchet-wheel being provided with teeth of unequal length, alternately one short and one long tooth, and a pawl engaging with the teeth of said ratchet-wheel, substantially as and for the purpose described.

7. In a brick-machine, a mouthpiece 8 for the mixing-barrel 4, a slot formed in said mouthpiece in a plane that forms an angle with the periphery of said mold-wheel, said slot extending into the mouth of said mixing-barrel, and a cut-off plate 89 in said slot, substantially as and for the purpose described.

8. In a brick-machine, a mold-wheel 12, consisting of disks 107 107, provided with recesses 113 upon the inner sides of said disks near their peripheries, plates 114, provided with shoulders 115 at their ends, said plates being adapted to fit into said recesses with said shoulders extending beyond said recesses, wedge-shaped posts 117, adapted to fit against the end edges of said plates, the ends of said posts resting upon said shoulders, and means for securing the ends of said posts to said disks, substantially as shown and described.

9. In a brick-machine, a mold-wheel 12, consisting of disks 107 107, provided with recesses 113 upon the inner sides of said disks near their peripheries, plates 114, provided with shoulders 115 at their ends, said plates being adapted to fit into said recesses with said shoulders extending beyond said recesses, wedge-shaped posts 117, adapted to fit snugly against the end edges of said plates, the ends of said posts resting upon said shoulders, and pull-bolts 17, provided with screw-threaded shanks, said shanks passing through apertures in said disks and screwing into apertures 118 in the ends of said posts to bind said posts and said disks together, substantially as shown and described.

10. A carrier for brick-machines, consisting of an endless belt passing over two rolls and driven by one of said rolls, an outer endless belt, and a support for the inner end of said outer belt, substantially as shown and described.

11. In a brick-machine, the combination of a mold-wheel 12, a re-pressing plunger 26, said re-pressing plunger consisting of a plunger 88, a frame 87, surrounding the plunger 88 at the sides and end of plunger 88, the lower edge of said frame extending normally below the lower surface of the plunger 88, strips 90 90 and stay-bails 91 91 upon said frame, rods 92 92, extending from plunger 88 through the strips 90 90 and stay-bails 91 91, nuts 94 94 upon said rods, coil-springs 93 93, pressing against said nuts and said strips, and means for reciprocating the plunger 26, substantially as and for the purpose specified.

SYLVESTER P. BABCOCK.

Witnesses:
ARTHUR E. BABCOCK.
H. V. KING.